United States Patent
Saroka et al.

(10) Patent No.: US 11,345,210 B2
(45) Date of Patent: May 31, 2022

(54) HIGH VOLTAGE AUXILIARY POWER UNIT FOR A TRANSPORTATION REFRIGERATION SYSTEM

(71) Applicant: Carrier Corporation, Palm Beach Gardens, FL (US)

(72) Inventors: Mary D. Saroka, Syracuse, NY (US); Jeffrey J. Burchill, Baldwinsville, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 8 days.

(21) Appl. No.: 16/754,564

(22) PCT Filed: Oct. 5, 2018

(86) PCT No.: PCT/US2018/054630
§ 371 (c)(1),
(2) Date: Apr. 8, 2020

(87) PCT Pub. No.: WO2019/074792
PCT Pub. Date: Apr. 18, 2019

(65) Prior Publication Data
US 2020/0346514 A1    Nov. 5, 2020

Related U.S. Application Data

(60) Provisional application No. 62/569,750, filed on Oct. 9, 2017.

(51) Int. Cl.
*B60H 1/00* (2006.01)
*F25B 27/00* (2006.01)
*F25D 11/00* (2006.01)

(52) U.S. Cl.
CPC ..... *B60H 1/00428* (2013.01); *B60H 1/00264* (2013.01); *F25B 27/00* (2013.01); *F25D 11/003* (2013.01)

(58) Field of Classification Search
CPC . B60H 1/00428; B60H 1/00264; F25B 27/00; F25D 11/003
See application file for complete search history.

(56) References Cited

U.S. PATENT DOCUMENTS

| | | | |
|---|---|---|---|
| 4,682,649 A | 7/1987 | Greer | |
| 4,780,618 A | 10/1988 | Wareman et al. | |

(Continued)

FOREIGN PATENT DOCUMENTS

| | | | |
|---|---|---|---|
| EP | 2689944 A2 * | 7/2013 | |
| EP | 2689944 A2 | 1/2014 | |

(Continued)

OTHER PUBLICATIONS

Notification of Transmittal of the International Search Report of International Application No. PCT/US2018/054630 Report Issued dated Jan. 16, 2019; Report Received dated Jan. 25, 2019; 6 pages.

(Continued)

*Primary Examiner* — Elizabeth J Martin
(74) *Attorney, Agent, or Firm* — Cantor Colburn LLP

(57) ABSTRACT

A transport refrigeration system is provided. The refrigeration transportation system comprising: a refrigerated cargo space; a refrigeration unit in operative association with the refrigerated cargo space, the refrigeration unit providing conditioned air to the refrigerated cargo space; a battery system configured to power the refrigeration unit; and an auxiliary power unit configured to charge the battery system when the power level of the battery system is equal to or below a first selected power level.

18 Claims, 5 Drawing Sheets

(56) References Cited

U.S. PATENT DOCUMENTS

| | | | |
|---|---|---|---|
| 5,333,678 | A | 8/1994 | Mellum et al. |
| 6,223,546 | B1 | 5/2001 | Chopko et al. |
| 6,755,041 | B2 | 6/2004 | Wessells et al. |
| 6,812,582 | B2 | 11/2004 | Kennedy |
| 7,049,707 | B2 | 5/2006 | Wurtele |
| 7,150,159 | B1 | 12/2006 | Brummett et al. |
| 7,151,326 | B2 | 12/2006 | Jordan |
| 7,582,978 | B2 | 9/2009 | Flanigan et al. |
| 7,673,466 | B2 | 3/2010 | Pacy |
| 8,295,950 | B1 | 10/2012 | Wordsworth et al. |
| 8,347,999 | B2 | 1/2013 | Koelsch et al. |
| 8,627,908 | B2 | 1/2014 | Wellborn et al. |
| 9,045,018 | B2 | 6/2015 | Swanson |
| 9,085,218 | B2 | 7/2015 | Awwad |
| 9,586,458 | B2 | 3/2017 | Larson et al. |
| 9,625,206 | B2 | 4/2017 | Ma et al. |
| 9,694,651 | B2 | 7/2017 | Zeigler et al. |
| 2004/0035112 | A1 | 2/2004 | Bhabra |
| 2008/0136257 | A1 | 6/2008 | Flanigan et al. |
| 2015/0239324 | A1 | 8/2015 | Kolda et al. |
| 2015/0328953 | A1 | 11/2015 | Sulc et al. |
| 2017/0144548 | A1 | 5/2017 | Ferguson |
| 2018/0111441 | A1* | 4/2018 | Menard .............. B60H 1/00428 |
| 2018/0319245 | A1* | 11/2018 | Chopko ............. B60H 1/00428 |
| 2018/0320956 | A1* | 11/2018 | Schumacher ............. H02J 1/14 |
| 2019/0264973 | A1* | 8/2019 | Koelsch ................... B60L 1/02 |

FOREIGN PATENT DOCUMENTS

| | | |
|---|---|---|
| WO | 2012138497 A1 | 10/2012 |
| WO | 2012138500 A1 | 10/2012 |
| WO | 2016147022 A1 | 9/2016 |
| WO | 2017095838 A1 | 6/2017 |
| WO | 2017155880 A1 | 9/2017 |

OTHER PUBLICATIONS

Written Opinion of the International Searching Authority of International Application No. PCT/US2018/054630; Report Issued dated Jan. 16, 2019; Report Received dated Jan. 25, 2019; 8 pages.

* cited by examiner

HIGH VOLTAGE AUXILIARY POWER UNIT FOR A TRANSPORTATION REFRIGERATION SYSTEM

CROSS-REFERENCE TO RELATED APPLICATIONS

This application is a National Stage Application of International Application No. PCT/US2018/054630 filed Oct. 5, 2018, which claims the benefit of U.S. Provisional Application No. 62/569,750 filed Oct. 9, 2017, the disclosures of which are incorporated herein by reference in their entirety.

BACKGROUND

The subject matter disclosed herein generally relates to the field of transport truck trailers, and more specifically, an apparatus and method for cooling transport truck trailers.

Typically, transport refrigeration systems are used to transport and distribute cargo, or more specifically perishable goods and environmentally sensitive goods (herein referred to as perishable goods) that may be susceptible to temperature, humidity, and other environmental factors. Perishable goods may include but are not limited to fruits, vegetables, grains, beans, nuts, eggs, dairy, seed, flowers, meat, poultry, fish, ice, and pharmaceuticals. Advantageously, transport refrigeration systems allow perishable goods to be effectively transported and distributed without damage or other undesirable effects.

Refrigerated transport truck trailers are commonly used to transport perishable goods in a cold chain distribution system. A transport refrigeration system includes a refrigeration unit in operative association with a cargo space defined within the refrigerated transport truck trailer for maintaining a controlled temperature environment within the cargo space.

Conventionally, transport refrigeration systems used in connection with refrigerated transport truck trailer include a refrigeration unit having a refrigerant compressor, a condenser with one or more associated condenser fans, an expansion device, and an evaporator with one or more associated evaporator fans, which are connected via appropriate refrigerant lines in a closed refrigerant flow circuit. Air or an air/gas mixture is drawn from the interior volume of the cargo space by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space.

On commercially available transport refrigeration systems used in connection with refrigerated transport truck trailer, the compressor, and typically other components of the refrigeration unit, must be powered during transit by a prime mover. The prime mover typically comprises a diesel engine carried on the vehicle transporting the transport refrigeration system.

BRIEF SUMMARY

According to one embodiment, a transport refrigeration system is provided. The refrigeration transportation system comprising: a refrigerated cargo space; a refrigeration unit in operative association with the refrigerated cargo space, the refrigeration unit providing conditioned air to the refrigerated cargo space; a battery system configured to power the refrigeration unit; and an auxiliary power unit configured to charge the battery system when the power level of the battery system is equal to or below a first selected power level.

In addition to one or more of the features described above, or as an alternative, further embodiments may include that the auxiliary power unit further comprises: an electric generation device; and an engine for driving the electric generation device, wherein the electric generation device is configured to generate electricity to charge the battery system when driven by the engine.

In addition to one or more of the features described above, or as an alternative, further embodiments may include that the auxiliary power unit is located in a container removably connected to the refrigerated cargo space.

In addition to one or more of the features described above, or as an alternative, further embodiments may include that the auxiliary power unit is configured to charge the battery system when the refrigeration unit is turned off.

In addition to one or more of the features described above, or as an alternative, further embodiments may include that the auxiliary power unit is electrically connected to a power convertor located within the refrigeration unit.

In addition to one or more of the features described above, or as an alternative, further embodiments may include that the auxiliary power unit is electrically connected to a transformer located within the refrigeration unit.

In addition to one or more of the features described above, or as an alternative, further embodiments may include that the auxiliary power unit further comprises a refrigeration circuit configured to provide cooling to the battery system.

In addition to one or more of the features described above, or as an alternative, further embodiments may include that the refrigeration unit is configured to turn off when a temperature within the refrigerated cargo space is less than or equal to a set-point temperature.

In addition to one or more of the features described above, or as an alternative, further embodiments may include that the refrigeration unit is configured to turn on when a temperature within the refrigerated cargo space is less greater than or equal to a restart temperature.

In addition to one or more of the features described above, or as an alternative, further embodiments may include a controller is coupled to the auxiliary power unit by communication lines and electrical lines.

In addition to one or more of the features described above, or as an alternative, further embodiments may include that the battery system is configured to power the refrigeration unit until a power level of the battery system is equal to or below the first selected power level.

According to another embodiment, a method of operating a transport refrigeration system is provided. The method comprising: providing conditioned air to a refrigerated cargo space using a refrigeration unit; powering the refrigeration unit using a battery system; and charging the battery system using an auxiliary power unit when the power level of the battery system is equal to or below a first selected power level.

In addition to one or more of the features described above, or as an alternative, further embodiments may include that the powering the refrigeration unit using an auxiliary power unit further comprises: driving an electric generation device using an engine; and generating electricity to charge the batter system using the electric generation device when driven by the engine.

In addition to one or more of the features described above, or as an alternative, further embodiments may include:

charging the battery system using the auxiliary power unit when the refrigeration unit is turned off.

In addition to one or more of the features described above, or as an alternative, further embodiments may include turning the refrigeration unit off when a temperature within the refrigerated cargo space is less than or equal to a set-point temperature.

In addition to one or more of the features described above, or as an alternative, further embodiments may include: turning the refrigeration unit on when a temperature within the refrigerated cargo space is less greater than or equal to a restart temperature.

According to another embodiment, a controller for a refrigeration unit of a transport refrigeration system is provide. The controller comprising: a processor; a memory comprising computer-executable instructions that, when executed by the processor, cause the processor to perform operations, the operations comprising: providing conditioned air to a refrigerated cargo space using a refrigeration unit; powering the refrigeration unit using a battery system; and charging the battery system using an auxiliary power unit when the power level of the battery system is equal to or below a first selected power level.

In addition to one or more of the features described above, or as an alternative, further embodiments may include that the powering the refrigeration unit using an auxiliary power unit further comprises: driving an electric generation device using an engine; and generating electricity to power the refrigeration unit using the electric generation device when driven by the engine.

In addition to one or more of the features described above, or as an alternative, further embodiments may include that the operations further comprise: charging the battery system using the auxiliary power unit when the refrigeration unit is turned off.

In addition to one or more of the features described above, or as an alternative, further embodiments may include that the operations further comprise: turning the refrigeration unit off when a temperature within the refrigerated cargo space is less than or equal to a set-point temperature.

Technical effects of embodiments of the present disclosure include connecting an auxiliary power unit to a battery powered refrigeration unit to a recharge the battery system, which powers the refrigeration unit.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

Figure 1:
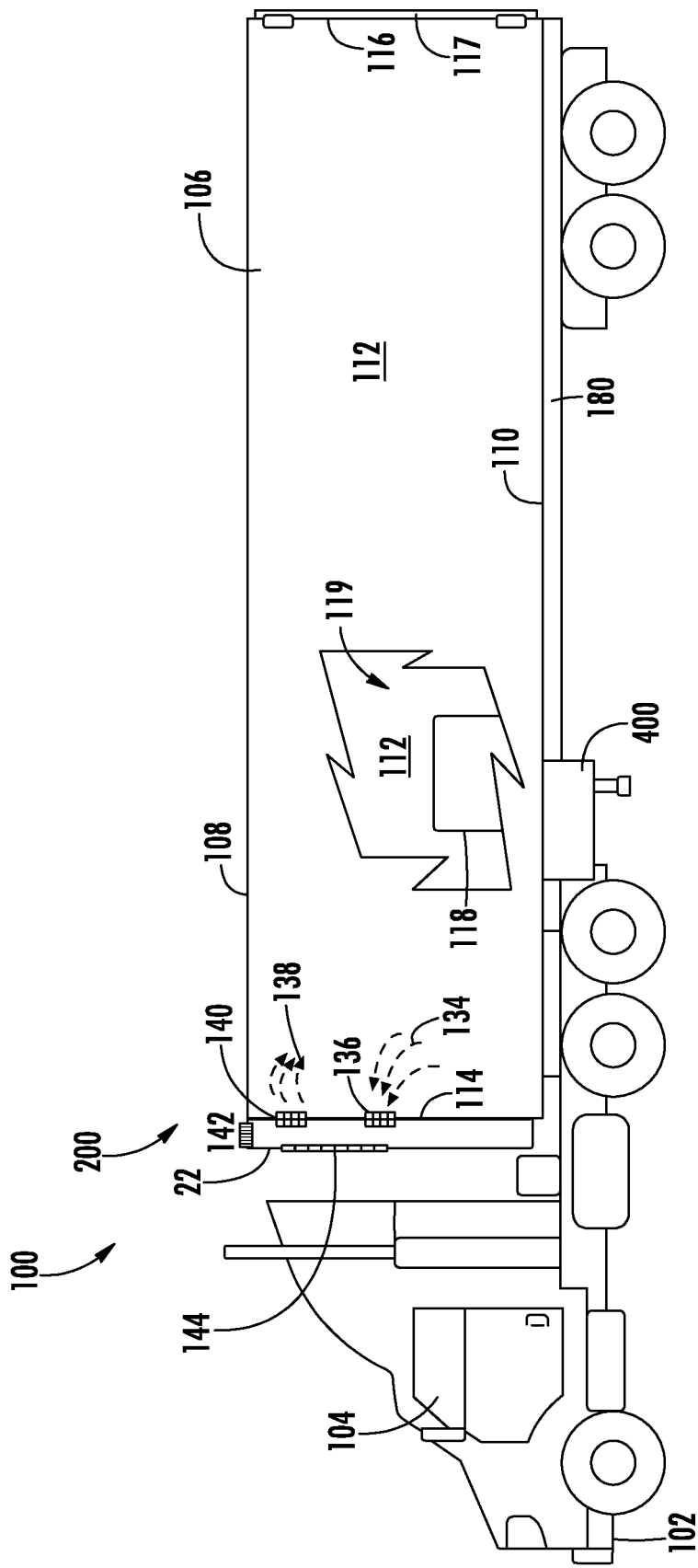
FIG. 1 is a schematic illustration of a transport refrigeration system, in accordance with an embodiment of the disclosure.
Figure 2A:
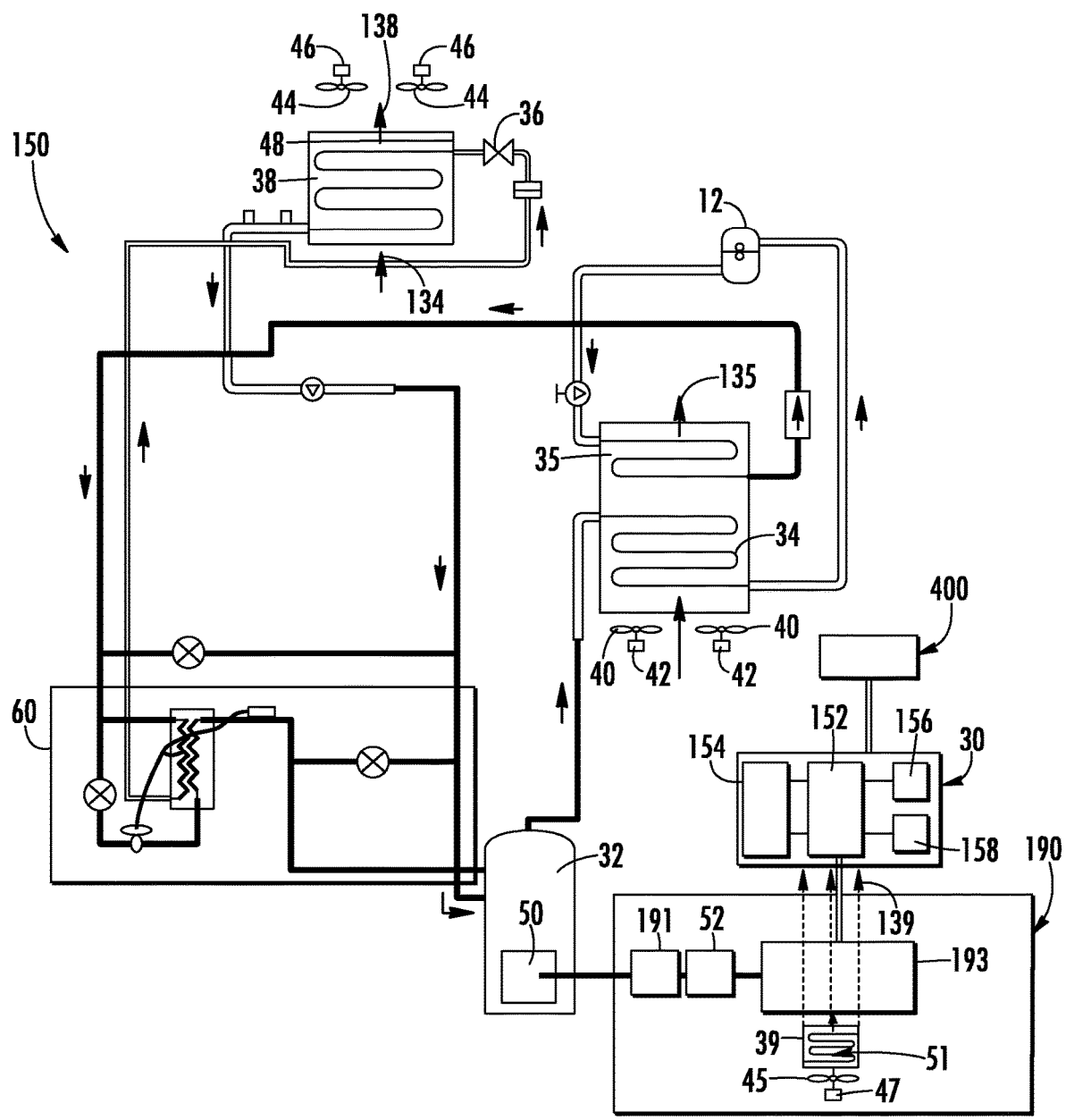
FIGS. 2a and 2b are an enlarged schematic illustrations of the transport refrigeration system of FIG. 1, in accordance with an embodiment of the disclosure.
Figure 2B:
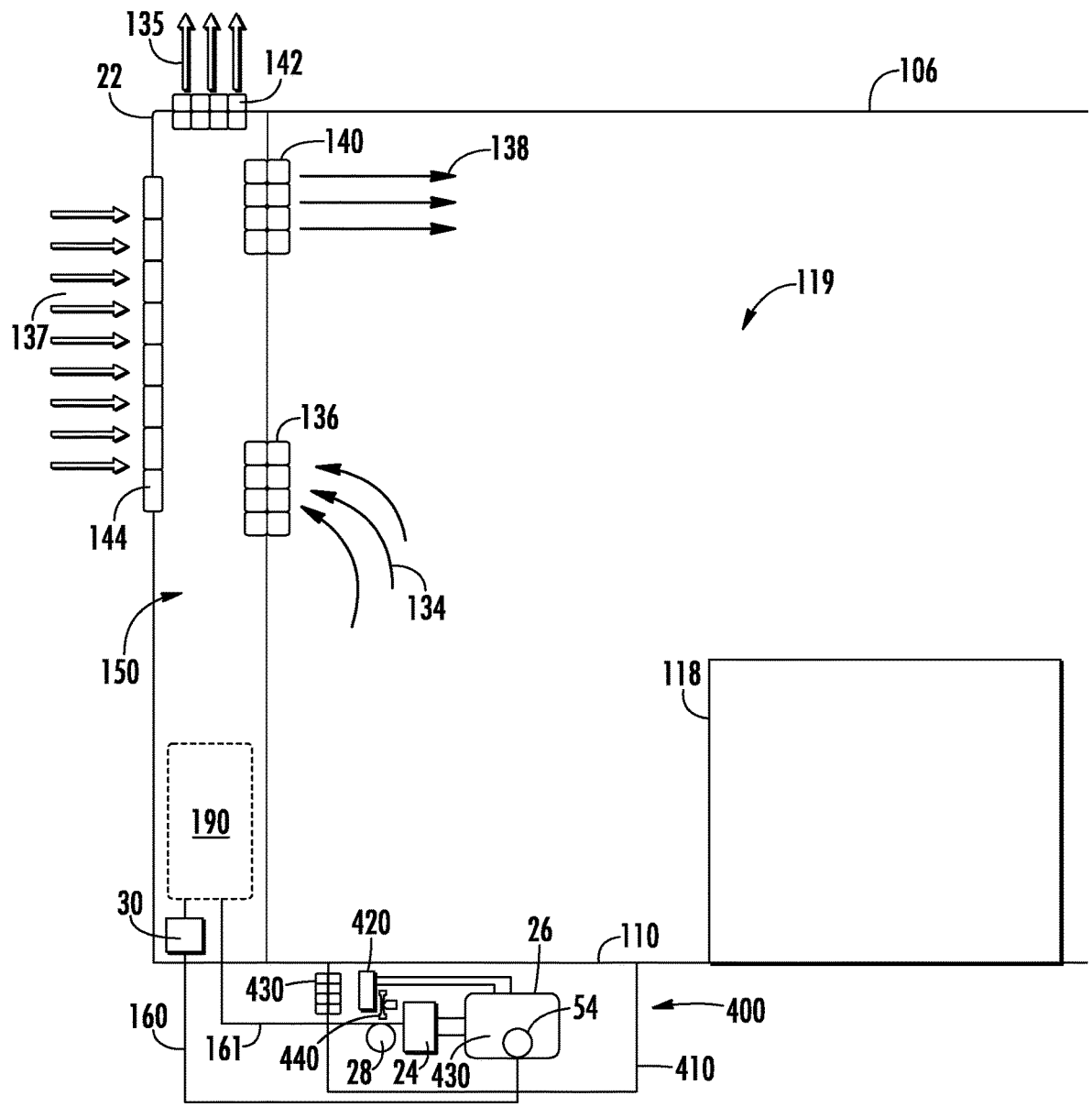
Figure 2C:
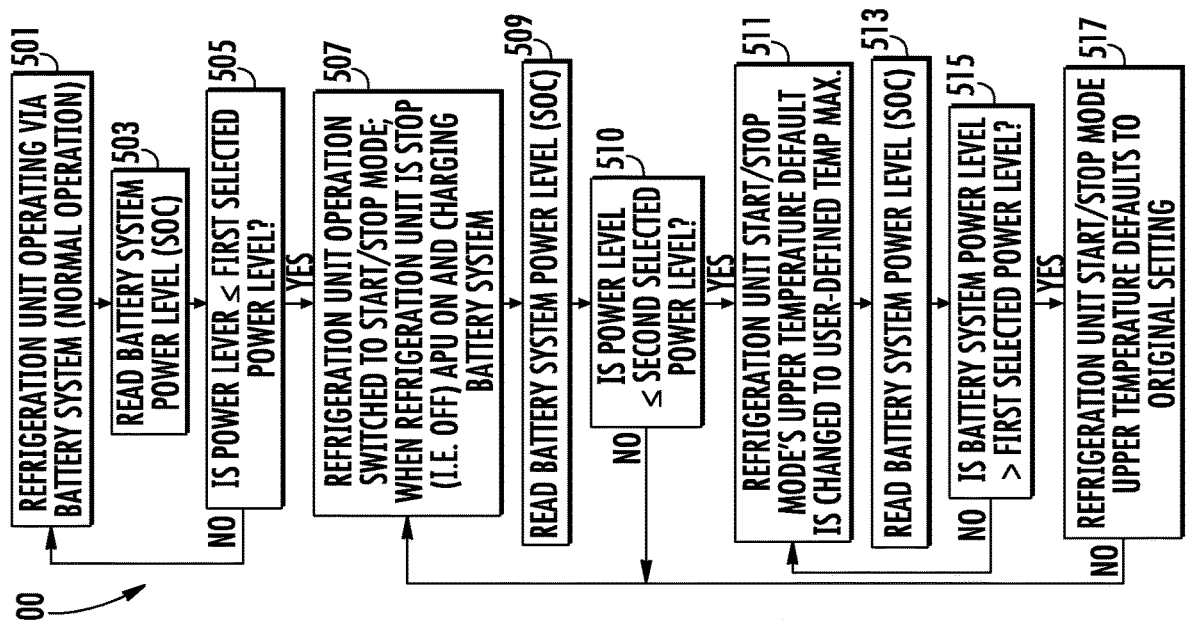
Figure 2C:
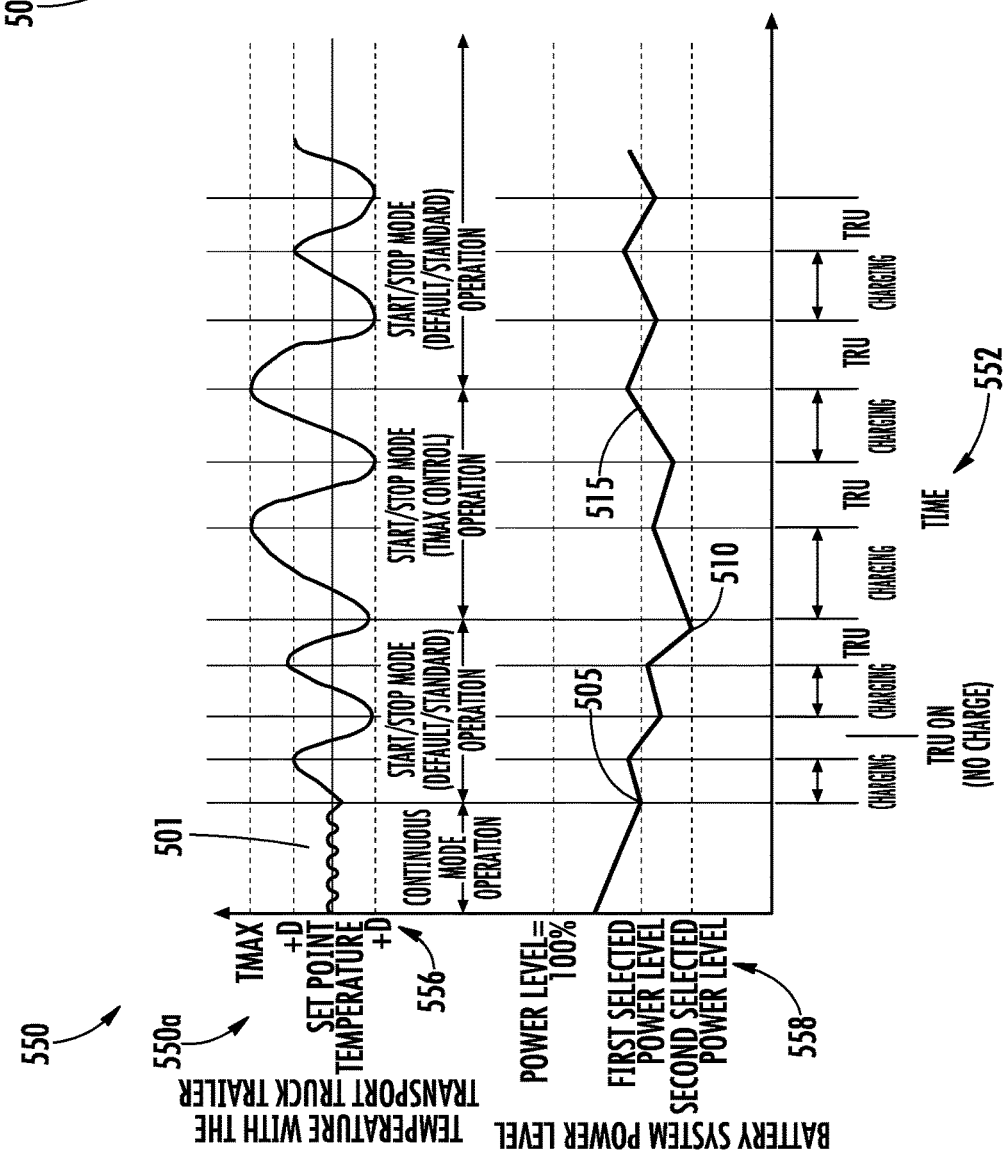
Figure 3:
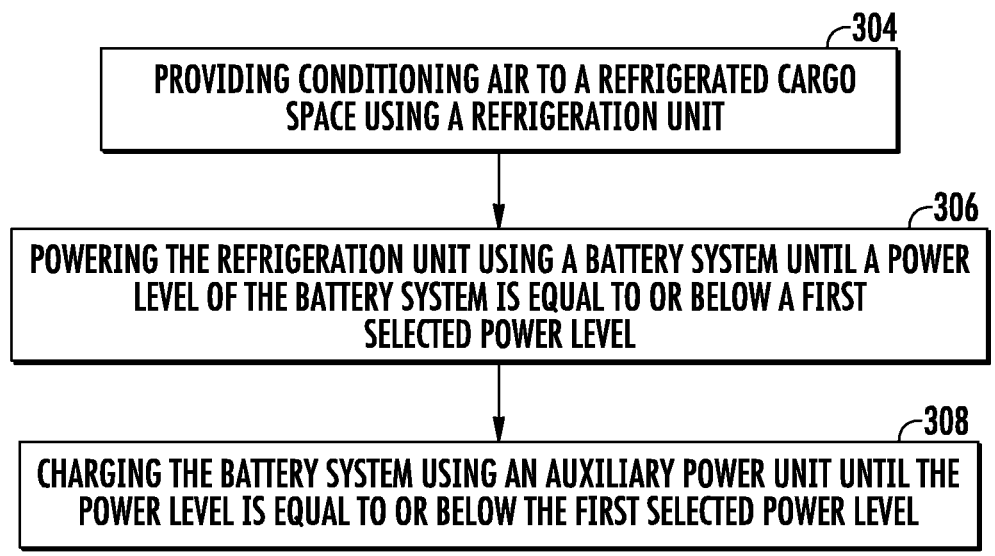

FIG. 2c is a flow diagram illustrating a method of operating a refrigeration unit of the transport refrigeration system of FIGS. 1, 2a, and 2b, according to an embodiment of the present disclosure; and FIG. 3 is a flow diagram illustrating a method of operating a refrigeration unit of the transport refrigeration system of FIGS. 1, 2a, 2b, and 2c according to an embodiment of the present disclosure.

DETAILED DESCRIPTION

A detailed description of one or more embodiments of the disclosed apparatus and method are presented herein by way of exemplification and not limitation with reference to the Figures.

Various embodiments of the present disclosure are related powering a transportation refrigeration unit. Transportation refrigeration units are typically powered by a diesel engine that functions as the prime mover of the transportation refrigeration unit. The diesel engine powers a compressor to run the refrigeration cycle of the transportation refrigeration unit. Due to decreased noise and emissions, battery systems may serve as an alternative prime mover to diesel engines. However, the power density of electric batteries is typically not as high as the diesel alternative, which leads to range anxiety. Embodiments disclosed herein address the range anxiety through a removable auxiliary power unit.

Referring now to FIGS. 1, 2a and 2b. FIG. 1 shows a schematic illustration of a transport refrigeration system 200, according to an embodiment of the present disclosure. FIG. 2a shows an enlarged schematic illustration of the transport refrigeration system circuit 150 of the refrigeration unit 22 (i.e. Transportation refrigeration unit (TRU)) and FIG. 2b shows an enlarged schematic illustration of the transport refrigeration system 200 according to an embodiment of the present disclosure. The transport refrigeration system 200 is being illustrated as a trailer system 100 as seen in FIG. 1. It is appreciated by those of skill in the art that embodiments described herein may be applied to any transport refrigeration system such as, for example shipping containers that are shipped by rail, sea, or any other suitable container, without use of a tractor 102. The trailer system 100 includes a tractor 102. The tractor 102 includes an operator's compartment or cab 104 and an engine (not shown), which acts as the drive system of the trailer system 100. The transport refrigeration system includes a transport truck trailer and a refrigeration unit 22. The refrigerated transport truck trailer 106 is coupled or releasably connected to the tractor 102. The refrigerated transport truck trailer 106 is a refrigerated trailer and includes a top wall 108, a directly opposed bottom wall 110, opposed side walls 112, and a front wall 114, with the front wall 114 being closest to the tractor 102. The refrigerated transport truck trailer 106 further includes a door or doors 117 at a rear wall 116, opposite the front wall 114. The walls of the refrigerated transport truck trailer 106 define a refrigerated cargo space 119.

Typically, transport refrigeration systems 200 are used to transport and distribute perishable goods and environmentally sensitive goods (herein referred to as perishable goods 118). The perishable goods 118 may include but are not limited to fruits, vegetables, grains, beans, nuts, eggs, dairy, seed, flowers, meat, poultry, fish, ice, blood, pharmaceuticals, or any other suitable cargo requiring refrigerated transport.

In the illustrated embodiment, the refrigeration unit 22 includes a battery system 190, as seen in FIG. 2a. The battery system 190 may comprise at least one of a lithium ion battery, a nickel-metal hydride battery, an alkaline battery, a nickel-hydrogen battery, a lead-acid battery, or any other energy storage device (ESD) known to one of skill in the art. The battery system 190 may include a power converter 52 and/or a transformer 191.

The operation of the battery system 190 is shown in FIG. 2c and method 500. A Chart 550 is included to help illustrate method 500. The chart 550 includes first chart 550a aligned with second chart 550b along a time axis 552. The first chart 550a illustrates a temperature within the transport truck trailer axis 556 versus time axis 552 and the second chart 550b illustrates a power level of the battery system axis 558 versus time axis 552. The battery system 190 is configured to power the refrigeration unit 22, thus when the refrigeration unit 22 is on, power is drawn from the battery system 190. At block 501, the refrigeration unit 22 is operating under the power of the battery system 190, which considered normal operation for the transport refrigeration system 200. At block 503, the power level (i.e. status of charge (SOC)) of the battery system 190 is detected. In an embodiment, a controller 30 may be able to detect the power level of the battery system 190. At block 505, if the power level of the battery system 190 is greater than a first selected power level then the battery system 190 may continue powering the refrigeration unit under normal operation at block 501. At block 505, if the power level of the battery system 190 is equal to or less than a first selected power level, then the refrigeration unit 22 is switched to start/stop operation mode at block 507 to allow charging the battery system 190 by activating the auxiliary power unit 400 during refrigeration system off-times.

Start/Stop mode is an operation mode selected by a user that allow the refrigeration unit 22 to turn "off" at a setpoint temperature to allow for battery charging. When the refrigeration unit 22 is off the auxiliary power unit 400 may be activated and charge the battery system 190. The auxiliary power unit 400 is described further below. The electric generation device 24 generates power when driven by the engine 26. While off, the temperature within the transport truck trailer 106 will likely increase (if ambient temperature is greater than trailer set point temperature) until a target maximum temperature ($T_{max}$ in Chart 550) is reached. Once the target maximum temperature ($T_{max}$ in Chart 550) is reached, the refrigeration unit 22 will turn "on" and provide cooling to the temperature within the transport truck trailer 106 back down to a setpoint temperature. There is also a continuous mode, which is an operation mode selected by a user that keep the refrigeration unit 22 "on" all the time, even when the set point is met. This mode allows tighter control of the temperature within the transport truck trailer 106 with smaller temperature variations.

While in while in the stop/start mode the method 500 operates under the steps outlined in blocks 509-517. At block 509, the power level of the battery system 190 is detected. At block 510, if the power level is greater than a second selected power level, then the method 500 returns back to block 507. At block 510, if the power level is less than or equal to a second selected power level, then the method 500 moves onto block 511, where the upper temperature default (+Δ in Chart 550) of the refrigeration unit 22 is changed to a user defined maximum temperature ($T_{max}$ in Chart 550). At block 513, the power level of the battery system 190 is detected. At block 515, if the power level of the battery system 190 is not greater than the first selected power level the method moves back to block 511. At block 515, if the power level of the battery system 190 is greater than the first selected power level the method moves onto block 517, where the upper temperature default of the refrigeration unit 22 is changed from the user defined maximum temperature, back to the original upper temperature default (+Δ in Chart 550).

In a non-limiting example, the first selected power level may be zero power. In another embodiment, a controller 30 may be able to detect when a power level of the battery system 190 is equal to or less than a second selected power level and then deactivate the refrigeration unit 22 and charge the battery system 190 by activating the auxiliary power unit 400 until a truck trailer set point temperature is above a selected maximum temperature setting at which the refrigeration unit 22 switches back to battery system power. The refrigeration unit 22 operates in this mode until the battery system 190 is greater than the first selected power level.

The refrigeration unit 22 functions, under the control of a controller 30, to establish and regulate a desired environmental parameters such as, for example temperature, pressure, humidity, carbon dioxide, ethylene, ozone, light exposure, vibration exposure, and other conditions in the interior compartment 119 as known to one of ordinary skill in the art. In an embodiment, the refrigeration unit 22 is a refrigeration system capable of providing a desired temperature and humidity range. The controller 30 is coupled directly by both communication lines 160 and electrical lines 161 to the auxiliary power unit 400. The controller 30 selectively operates the engine 26 of the auxiliary power unit 400, typically through an electronic engine controller 54 operatively associated with the engine 26.

The refrigeration unit 22 includes a refrigerant compression device 32, a refrigerant heat rejection heat exchanger 34, an expansion device 36, and a refrigerant heat absorption heat exchanger 38 connected in refrigerant flow communication in a closed loop refrigerant circuit and arranged in a conventional refrigeration cycle. The refrigeration unit 22 also includes one or more fans 40 associated with the refrigerant heat rejection heat exchanger 34 and driven by fan motor(s) 42, one or more fans 44 associated with the refrigerant heat absorption heat exchanger 38 and driven by fan motor(s) 46. The heat rejection heat exchanger 34 may also include a second heat rejection heat exchanger 35 disposed in a series refrigerant flow relationship and downstream of the first heat rejection heat exchanger 34. The refrigeration unit 22 may also include a heater 48 associated with the refrigerant heat absorption heat exchanger 38. In an embodiment, the heater 48 may be an electric resistance heater. It is to be understood that other components (not shown) may be incorporated into the refrigerant circuit as desired, including for example, but not limited to, a suction modulation valve, a receiver 12, a filter/dryer, an economizer circuit 60.

The refrigerant heat rejection heat exchanger 34 may, for example, comprise one or more refrigerant conveying coiled tubes or one or more tube banks formed of a plurality of refrigerant conveying tubes across flow path to the heat outlet 142. The fan(s) 40 are operative to pass air, typically ambient air, across the tubes of the refrigerant heat rejection heat exchanger 34 to cool refrigerant vapor passing through the tubes. The refrigerant heat rejection heat exchanger 34 may operate either as a refrigerant condenser, such as if the refrigeration unit 22 is operating in a subcritical refrigerant cycle or as a refrigerant gas cooler, such as if the refrigeration unit 22 is operating in a transcritical cycle.

The refrigerant heat absorption heat exchanger 38 may, for example, also comprise one or more refrigerant conveying coiled tubes or one or more tube banks formed of a plurality of refrigerant conveying tubes extending across flow path from a return air inlet 136. The fan(s) 44 are operative to pass air drawn from the refrigerated cargo space 119 across the tubes of the refrigerant heat absorption heat exchanger 38 to heat and evaporate refrigerant liquid passing through the tubes and cool the air. The air cooled in traversing the refrigerant heat rejection heat exchanger 38 is supplied back to the refrigerated cargo space 119 through a refrigeration unit outlet 140. It is to be understood that the term "air" when used herein with reference to the atmosphere within the cargo box includes mixtures of air with other gases, such as for example, but not limited to, nitrogen or carbon dioxide, sometimes introduced into a refrigerated cargo box for transport of perishable produce.

The refrigeration unit 22 may include a second refrigeration circuit 51 configured to provide cooling to the battery system 190. The second refrigerant heat absorption heat exchanger 39 may, for example, also comprise one or more refrigerant conveying coiled tubes or one or more tube banks formed of a plurality of refrigerant conveying tubes. A fan(s) 45 are operative to pass air 139 across the tubes of the second refrigerant heat absorption heat exchanger 39 to heat and evaporate refrigerant liquid passing through the tubes and cool the air 139. The air cooled 139 in traversing the second refrigerant heat absorption heat exchanger 39 is then passed over battery packs 193 to cool the battery system 190. Although not shown in FIG. 2a, the cooled air 139 may also pass over a power converter 52 and a transformer 191 for the battery system 190.

The refrigerant compression device 32 may comprise a single-stage or multiple-stage compressor such as, for example, a reciprocating compressor or a scroll compressor. The compression device 32 has a compression mechanism (not shown) driven by an electric motor 50. In an embodiment, the motor 50 may be disposed internally within the compressor with a drive shaft interconnected with a shaft of the compression mechanism, all sealed within a common housing of the compression device 32.

The transport refrigeration system 200 includes the controller 30 configured for controlling operation of the transport refrigeration system 200 including, but not limited to, the operation of various components of the refrigerant unit 22 to provide and maintain a desired thermal environment within the refrigerated cargo space 119. The controller 30 may also be able to selectively operate the battery system 190 and auxiliary power unit 400. The controller 30 may be an electronic controller including a processor and an associated memory comprising computer-executable instructions that, when executed by the processor, cause the processor to perform various operations. The processor may be but is not limited to a single-processor or multi-processor system of any of a wide array of possible architectures, including field programmable gate array (FPGA), central processing unit (CPU) 152, application specific integrated circuits (ASIC) 156, digital signal processor (DSP) 158 or graphics processing unit (GPU) hardware arranged homogenously or heterogeneously. The memory 154 may be a storage device such as, for example, a random access memory (RAM), read only memory (ROM), or other electronic, optical, magnetic or any other computer readable medium.

The refrigeration unit 22 has a plurality of power demand loads, including, but not limited to, the compression device drive motor 50, the drive motor 42 for the fan 40 associated with the refrigerant heat rejection heat exchanger 34, the drive motor 46 for the fan 44 associated with the refrigerant heat absorption heat exchanger 38, and the drive motor 47 for the fan 45 associated with the refrigerant heat absorption heat exchanger 39. In the depicted embodiment, the heater 48 also constitutes a power demand load. The electric resistance heater 48 may be selectively operated by the controller 30 whenever a control temperature within the refrigerated cargo space 119 drops below a preset lower temperature limit, which may occur in a cold ambient environment. In such an event the controller 30 would activate the heater 48 to heat air circulated over the heater 48 by the fan(s) 44 associated with the refrigerant heat absorption heat exchanger 38. The heater 48 may also be used to de-ice the return air intake 136.

Referring to FIG. 2b, Airflow is circulated into and through the refrigerate cargo space 119 of the refrigerated transport truck trailer 106 by means of the refrigeration unit 22. A return airflow 134 flows into the refrigeration unit 22 from the refrigerated cargo space 119 through the refrigeration unit return air intake 136, and across the refrigerant heat absorption heat exchanger 38 via the fan 44, thus conditioning the return airflow 134 to a selected or predetermined temperature. The conditioned return airflow 134, now referred to as supply airflow 138, is supplied into the refrigerated cargo space 119 of the refrigerated transport truck trailer 106 through the refrigeration unit outlet 140, which in some embodiments is located near the top wall 108 of the transport truck trailer 106. Heat 135 is removed from the refrigerant heat rejection heat exchanger 34 through the heat outlet 142. The refrigeration unit 22 contains an external air inlet 144, as shown in FIG. 2b, to aid in the removal of heat 135 from the refrigerant heat rejection heat exchanger 34 by pulling in external air 137. The supply airflow 138 cools the perishable goods 118 in the refrigerated cargo space 119 of the refrigerated transport truck trailer 106 to a specific set-point temperature. It is to be appreciated that the refrigeration unit 22 can further be operated in reverse to warm the transport truck trailer 106 when, for example, the outside temperature is very low. In the illustrated embodiment, the return air intake 136, the refrigeration unit outlet 140, the heat outlet 142, and the external air inlet 144 are configured as grilles to help prevent foreign objects from entering the refrigeration unit 22.

Separate from the transport refrigeration system 200 is the auxiliary power unit 400 composed of an electric generation device 24 and an engine 26 for driving the electric generation device 24. The auxiliary power unit 400 charges the battery system 190 when a power level of the battery system 190 is equal to or less than a first or second selected power level. Alternatively, the refrigeration unit may be shut off manually and the battery system 190 charged by the auxiliary power unit 400 at any time desired by the operator. During the first selected power level condition, the refrigeration unit 22 is switched to start/stop operating mode and the auxiliary power unit 400 is activated when the refrigeration unit 22 is off, a condition which occurs when a temperature set-point within the transport truck trailer 106 has been met. During the second selected power level auxiliary power activation, the refrigeration unit 22 is still in start/stop mode and the controller 30 changes the current Restart Temperature setting to a selected higher Restart Temperature, thereby increasing off time of the refrigeration unit 22 to charge the battery system 190 for a longer period. Once the Restart Temperature settings are met (e.g. temperature within the refrigerated cargo space 119 is greater than or equal to the restart temperature), the auxiliary power unit 400 will stop charging the battery system 190 and the refrigeration unit 22 will start and use electrical power from the battery system 190. In an embodiment, the second selected power level may be equal to the first selected power level. The auxiliary power unit 400 is electrically connected to the power convertor 52 located within the refrigeration unit 22. The auxiliary power unit 400 is electrically connected to the transformer 191 located within the refrigeration unit 52.

The engine 26, which may comprise a fossil-fuel engine, most commonly a diesel engine, drives the electric generation device 24 that generates electrical power. The engine 26 may be a 19 kW or less diesel engine. The drive shaft of the engine drives the shaft of the electric generation device 24. The electric generation device 24 may comprise a single engine driven AC generator configured to generate single or three-phase alternating current (AC) power including at least one AC voltage at one or more frequencies. In an embodiment, the electric generation device 24 may, for example, be a permanent magnet/synchronous AC generator or an induction/asynchronous AC generator. In another embodiment, the electric generation device 24 may comprise a single on-board, engine driven DC generator configured to generate direct current (DC) power at at least one voltage. Some electric generation devices may have internal voltage regulators while other electric generation devices do not. As each of the fan motors 42, 46, 47 and the compression device drive motor 50 may be an AC motor or a DC motor, it is to be understood that various power converters 52, such as AC to DC rectifiers, DC to AC inverters, AC to AC voltage/frequency converters, and DC to DC voltage converters, may be employed in connection with the electric generation device 24 as appropriate. The transport refrigeration system 200 may include a voltage sensor 28 to sense the voltage of the electric generation device 24.

The auxiliary power unit 400 is housed in a container 410 that may be releasable connected to a bottom 180 of the refrigerated transport truck trailer 106. The container 410 may include a heat outlet 430 to allow heat from a radiator 420 thermally connected to the engine 26 to escape. The auxiliary power unit 400 may also include a fan 440 to pass air across the radiator 420. The heat outlet 430 may be configured as a grill to help prevent foreign objects from entering the container 410. It is appreciated by those of skill in the art that the auxiliary power unit 400 need not include an engine 26 and electric generation device 24 as illustrated in FIG. 2b, but instead may be any other power source as known by one of skill in the art.

Referring now also to FIG. 3 with continued reference to FIGS. 1, 2a and 2b. FIG. 3 shows a flow diagram illustrating a method 300 of operating the transport refrigeration system 200 of FIG. 1. At block 304, conditioned air or supply air flow 138 is provided to a refrigerated cargo space 119 using a refrigeration unit 22. At block 306, the refrigeration unit 22 is powered using a battery system 190 until a power level of the battery system 190 is equal to or below a first selected power level.

At block 308, the controller 30 of the refrigeration unit 22 switches operation to start/stop mode and the refrigeration unit 22 is powered using an auxiliary power unit 400 when the power level of the battery system 190 is equal to or below the first selected power level.

While the above description has described the flow process of FIG. 3 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes a device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:
1. A transport refrigeration system comprising:
a refrigerated cargo space;
a refrigeration unit in operative association with the refrigerated cargo space, the refrigeration unit providing conditioned air to the refrigerated cargo space;
a battery system configured to power the refrigeration unit,
a housing, the refrigeration unit and the battery system being located within the housing;
a container located outside of the housing; and
an auxiliary power unit located in the container, the auxiliary power unit configured to charge the battery system when the power level of the battery system is equal to or below a first selected power level, wherein the container is connected to a bottom of a refrigerated transport truck trailer or the container is releasably connected to the bottom of the refrigerated transport truck trailer.

2. The transport refrigeration system of claim 1, wherein the auxiliary power unit further comprises:
an electric generation device; and
an engine for driving the electric generation device, wherein the electric generation device is configured to generate electricity to charge the battery system when driven by the engine.

3. The transport refrigeration system of claim 1, wherein the container is removably connected to the refrigerated cargo space.

4. The transport refrigeration system of claim 1, wherein the auxiliary power unit is configured to charge the battery system when the refrigeration unit is turned off.

5. The transport refrigeration system of claim 4, wherein the refrigeration unit is configured to turn off when a temperature within the refrigerated cargo space is less than or equal to a set-point temperature.

6. The transport refrigeration system of claim 5, wherein the refrigeration unit is configured to turn on when a temperature within the refrigerated cargo space is greater than or equal to a restart temperature.

7. The transport refrigeration system of claim 1, wherein the auxiliary power unit further comprises a refrigeration circuit configured to provide cooling to the battery system.

8. The transport refrigeration system of claim 1, wherein the battery system is configured to power the refrigeration unit until a power level of the battery system is equal to or below the first selected power level.

9. A method of operating a transport refrigeration system, the method comprising:
providing conditioned air to a refrigerated cargo space using a refrigeration unit located within a housing;
powering the refrigeration unit using a battery system located within the housing; and
charging the battery system using an auxiliary power unit when the power level of the battery system is equal to or below a first selected power level,
wherein the battery system is located in a container that is located outside of the housing, and
wherein the container is connected to a bottom of a refrigerated transport truck trailer or the container is releasably connected to the bottom of the refrigerated transport truck trailer.

10. The method of claim 9, wherein the powering the refrigeration unit using the auxiliary power unit further comprises:
driving an electric generation device using an engine; and
generating electricity to charge the batter system using the electric generation device when driven by the engine.

11. The method of claim 9, further comprising:
charging the battery system using the auxiliary power unit when the refrigeration unit is turned off.

12. The method of claim 11, further comprising:
turning the refrigeration unit off when a temperature within the refrigerated cargo space is less than or equal to a set-point temperature.

13. The method of claim 12, further comprising:
turning the refrigeration unit on when a temperature within the refrigerated cargo space is greater than or equal to a restart temperature.

14. A controller for a refrigeration unit of a transport refrigeration system comprising:
a processor;
a memory comprising computer-executable instructions that, when executed by the processor, cause the processor to perform operations, the operations comprising:
providing conditioned air to a refrigerated cargo space using a refrigeration unit located within a housing;
powering the refrigeration unit using a battery system located within the housing; and
charging the battery system using an auxiliary power unit when the power level of the battery system is equal to or below a first selected power level,
wherein the battery system is located in a container that is located outside of the housing, and
wherein the container is connected to a bottom of a refrigerated transport truck trailer or the container is releasably connected to the bottom of the refrigerated transport truck trailer.

15. The controller of claim 14, wherein the powering the refrigeration unit using an auxiliary power unit further comprises:
driving an electric generation device using an engine; and
generating electricity to power the refrigeration unit using the electric generation device when driven by the engine.

16. The controller of claim 14, wherein the operations further comprise:
charging the battery system using the auxiliary power unit when the refrigeration unit is turned off.

17. The controller of claim 16, wherein the operations further comprise:
turning the refrigeration unit off when a temperature within the refrigerated cargo space is less than or equal to a set-point temperature.

18. The transport refrigeration system of claim 1, wherein the housing is connected to a front wall of the refrigerated transport truck trailer.

\* \* \* \* \*